United States Patent
Trivelpiece et al.

(10) Patent No.: US 11,295,268 B2
(45) Date of Patent: Apr. 5, 2022

(54) SYSTEMS AND METHODS FOR DETERMINING AN INVENTORY USING A HYBRID LIGHTING AND INVENTORY SYSTEM

(71) Applicants: Steve E. Trivelpiece, Rancho Santa Margarita, CA (US); Adam S. Bergman, Boca Raton, FL (US); Craig E. Trivelpiece, Mission Viejo, CA (US); Eric F. Riggert, Trabuco Canyon, CA (US)

(72) Inventors: Steve E. Trivelpiece, Rancho Santa Margarita, CA (US); Adam S. Bergman, Boca Raton, FL (US); Craig E. Trivelpiece, Mission Viejo, CA (US); Eric F. Riggert, Trabuco Canyon, CA (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 16/279,222

(22) Filed: Feb. 19, 2019

(65) Prior Publication Data

US 2020/0265374 A1 Aug. 20, 2020

(51) Int. Cl.
| | |
|---|---|
| *F21V 23/04* | (2006.01) |
| *H05B 45/22* | (2020.01) |
| *G06Q 10/08* | (2012.01) |
| *H05B 47/19* | (2020.01) |
| *G06K 7/10* | (2006.01) |

(52) U.S. Cl.
CPC ....... *G06Q 10/087* (2013.01); *G06K 7/10356* (2013.01); *H05B 47/19* (2020.01)

(58) Field of Classification Search
CPC ........ F21V 23/0471; F21K 9/00; F21K 9/232; H05B 45/10; H05B 45/20; Y02B 20/445; Y02B 20/44
See application file for complete search history.

(56) References Cited

U.S. PATENT DOCUMENTS 8,013,545 B2   9/2011   Jonsson
9,672,396 B1 *  6/2017   Bookman ............ G06Q 10/087
(Continued)

FOREIGN PATENT DOCUMENTS

EP   2642437 A1   9/2013
WO   2016048790 A1   3/2016

OTHER PUBLICATIONS

European Search Report issued in corresponding International Applicaton No. EP20158190.7 dated Apr. 24, 2020.

*Primary Examiner* — Mirza F Alam
(74) *Attorney, Agent, or Firm* — Arent Fox LLP

(57) ABSTRACT

Systems and methods for determining an inventory. The methods comprise: performing operations by an internal circuit of a light provider to control operations of a light element to produce visible light, where the light provider is coupled to a light fixture installed on a physical structure of a facility; and performing operations by the internal circuit to connect with a network, receive a tag identifier associated with an alert event from at least one external device via the network, read tags, and control the light element to modify at least one characteristic of the visible light produced thereby when information read from one of the tags includes the tag identifier.

22 Claims, 9 Drawing Sheets

(56) References Cited

U.S. PATENT DOCUMENTS

| | | | |
|---|---|---|---|
| 9,818,083 B1* | 11/2017 | Lauka | G06K 7/10237 |
| 9,846,795 B2 | 12/2017 | Russell | |
| 10,096,219 B1 | 10/2018 | Maurer et al. | |
| 10,346,657 B1* | 7/2019 | White | G06K 7/10099 |
| 2012/0026726 A1* | 2/2012 | Recker | F21V 21/0824 |
| | | | 362/157 |
| 2012/0235579 A1* | 9/2012 | Chemel | F21V 21/15 |
| | | | 315/152 |
| 2013/0241699 A1* | 9/2013 | Covaro | G06K 7/10009 |
| | | | 340/10.1 |
| 2014/0285095 A1* | 9/2014 | Chemel | F21S 2/005 |
| | | | 315/152 |
| 2016/0092704 A1* | 3/2016 | Russell | G06K 7/10009 |
| | | | 340/10.3 |
| 2019/0080280 A1* | 3/2019 | Tingler | G06K 7/10475 |

* cited by examiner

SYSTEMS AND METHODS FOR DETERMINING AN INVENTORY USING A HYBRID LIGHTING AND INVENTORY SYSTEM

BACKGROUND

Statement of the Technical Field

The present disclosure relates generally to lighting networks and inventory tracking systems. More particularly, the present disclosure relates to implementing systems and methods for determining an inventory using a hybrid lighting and inventory system.

Description of the Related Art

Light bulb networks have been developed to facilitate home automation. The light bulb networks comprise smart light bulbs that are configured to fit in conventional light fixtures, and to wirelessly communicate with a home automation system and/or each other. The home automation system controls the on/off state of the smart light bulbs, as well as the intensity and/or color of light emitted from the smart light bulbs.

RFID systems are commonly used for monitoring items (e.g., goods and equipment) and recording information on the items. An RFID system typically includes an RFID reader and an RFID device such as a tag or label. The RFID reader may transmit a Radio-Frequency ("RF") carrier signal to the RFID device. The RFID device may respond to the RF carrier signal (or interrogator signal) with a data response signal (or authentication reply signal) encoded with information stored on the RFID device. RFID devices may store information such as a unique identifier or an Electronic Product Code ("EPC") associated with an article or item.

SUMMARY

The present disclosure concerns implementing systems and methods for determining an inventory. The methods comprise: performing operations by an internal circuit of a light provider to control operations of a light element (e.g., a light bulb or a light tube) to produce visible light, where the light provider is coupled to a light fixture installed on a physical structure (e.g., a wall, ceiling, floor, display equipment, POS station, racks, etc.) of a facility (e.g., a retail store); and performing operations by the internal circuit to connect with a network, receive a tag identifier associated with an alert event from at least one external device via the network, read tags, and control the light element to modify at least one characteristic of the visible light produced thereby when information read from one of the tags includes the tag identifier. The tag reads may be performed in a manner that minimizes an effect of heat generated by the internal circuit on a life of the light element (e.g., at a pre-defined read rate).

In some scenarios, the internal circuit comprises an antenna printed on the light bulb or light tube. Additionally or alternatively, the internal circuit further: controls at least one of an on/off state, a brightness and a color of the light element; and/or communicates information read from the tags to at least one of the external devices via the network.

In those or other scenarios, the internal circuit performs operations to: receive a notification from the external device when a person is detected near the light provider; and control the light element to provide the visible light with the given characteristics when (a) information read from one of the tags includes the tag identifier and (b) the information is read within a pre-defined period of time from the light provider's reception of the notification. The internal circuit may also cause the light fixture to issue an alarm when information read from one of the tags includes the tag identifier. The internal circuit may further: control the light provider such that the light provider outputs light and/or RF energy that is harvestable by at least one of the tags and/or other energy harvesting device(s); and/or perform operations to decrease a first brightness level of the light element and cause an increase in a second brightness level of a light element of at least one adjacent light provider to optimize a quality of an image or video that is to be captured by a camera integrated with the light fixture or a camera placed in proximity to the light fixture.

The present disclosure also concerns a light provider. The light provider comprises: a light element configured to produce visible light; a base coupled to the light element, configured to fit in a light fixture, and comprising a power contact for connecting to an external power source via the light fixture; and an internal circuit configured to control operations of the light element, connect with a network, receive a tag identifier associated with an alert event or other event from at least one external device via the network, read tags, and control the light element to modify at least one characteristic of the visible light produced thereby when information read from one of the tags includes the tag identifier.

In some scenarios, the internal circuit is also configured to receive a notification from the external device when a person is detected near the light provider; and control the light element to provide the visible light with the given characteristics when (a) information read from one of the tags includes the tag identifier and (b) the information is read within a pre-defined period of time from the light provider's reception of the notification. Additionally or alternatively, the internal circuit is configured to: cause the light fixture to issue an alarm when information read from one of the tags includes the tag identifier; control the light provider such that the light provider outputs at least one of light and RF energy that is harvestable by at least one of the tags or other energy harvesting device(s); and/or decrease a first brightness level of the light element and cause an increase in a second brightness level of a light element of at least one adjacent light provider to optimize a quality of an image or video that is to be captured by a camera integrated with the light fixture or a camera placed in proximity to the light fixture.

BRIEF DESCRIPTION OF THE DRAWINGS

The present solution will be described with reference to the following drawing figures, in which like numerals represent like items throughout the figures.

DETAILED DESCRIPTION

Figure 1:
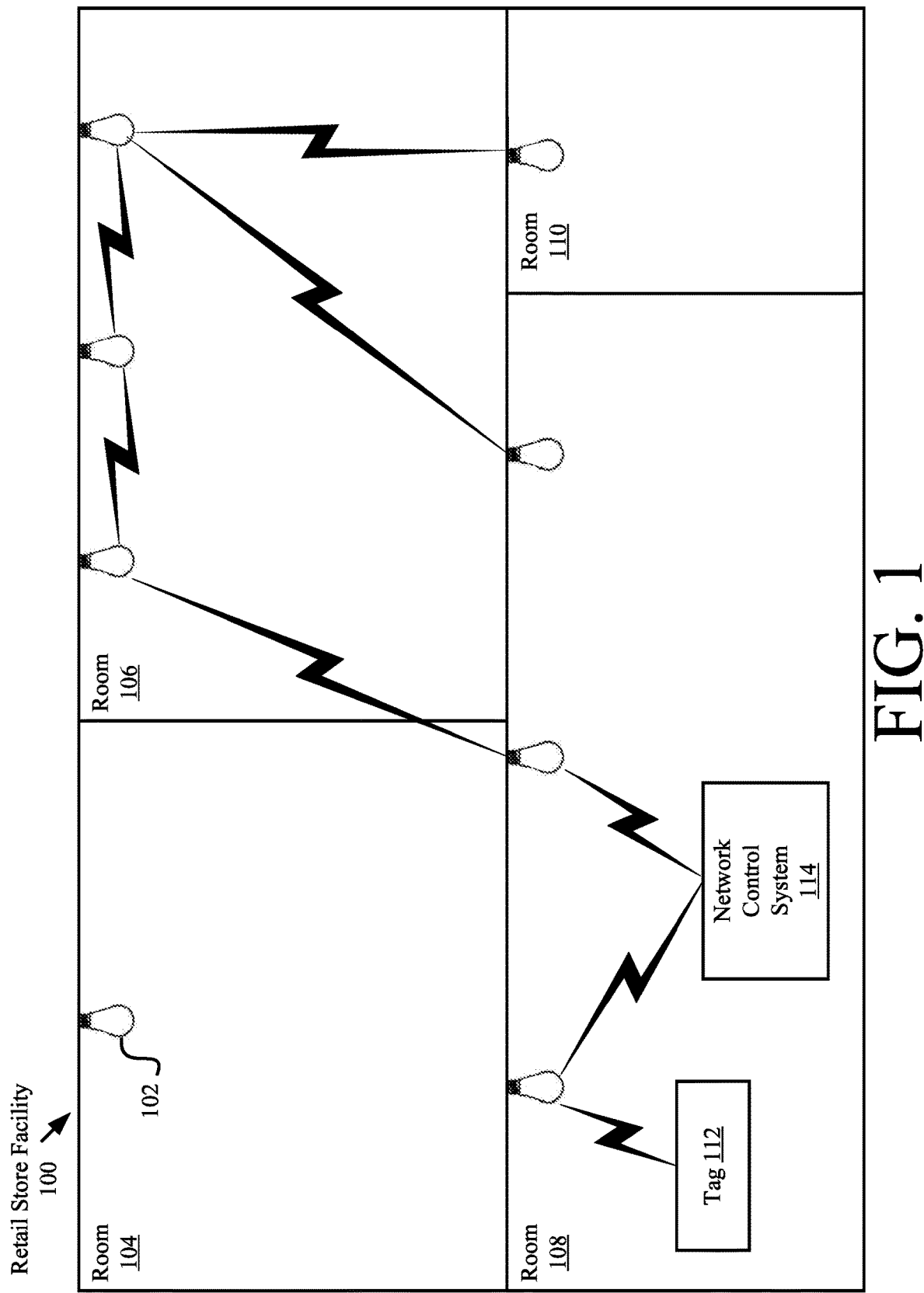
FIG. 1 is an illustration of an illustrative architecture for a retail store facility.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution generally concerns systems and methods for determining an inventory using a hybrid lighting and inventory system. The methods involve: performing operations by an internal circuit of a light provider to control operations of a light element (e.g., a light bulb or a light tube) to produce visible light, where the light provider is coupled to a light fixture installed on a physical structure (e.g., a wall, ceiling, floor, display equipment, POS station, racks, etc.) of a facility (e.g., a retail store facility); and performing operations by the internal circuit to connect with a network, receive a tag identifier associated with an alert event from at least one external device via the network, read tags, and control the light element to modify at least one characteristic of the visible light produced thereby when information read from one of the tags includes the tag identifier. The tag reads may be performed in a manner that minimizes an effect of heat generated by the internal circuit on a life of the light element.

The present solution will be described below in relation to retail store applications. The present solution is not limited in this regard. The present solution can be used in any application in which an inventory needs to be determined and/or tracked.

Illustrative Inventory System

Referring now to FIG. 1, there is provided an illustration of an illustrative Retail Store Facility ("RSF") 100 implementing the present solution. The RSF 100 comprises a plurality of rooms 104, 106, 108, 110 with a hybrid Inventory and Lighting ("LI") system disposed therein. The rooms include, but are not limited to, fitting rooms, bathrooms, self-checkout areas, and/or Point of Sale ("POS") areas. The hybrid LI system comprises a plurality of networked light providers 102. The light providers 102 include, but are not limited to, light bulbs (e.g., florescent bulbs, incandescent bulbs, and/or LED bulbs) and/or light tubes (e.g., florescent tubes). The light providers 102 are configured to fit in conventional light fixtures installed on the walls, ceilings, mirrors or other structural elements of the RSF 100. The conventional light fixtures can include, but are not limited to, light sockets, emergency lighting fixtures, elevator lighting fixtures, display equipment lighting fixtures, rack lighting fixtures, floor lighting fixtures, POS lighting fixtures, and/or self-checkout kiosk lighting fixtures.

The networked light providers 102 communicate with each other and/or a network control system 114 over a wireless communications network and/or a wired communications network. The wireless communications network includes, but is not limited to, a Z-wave network, a Zigbee network, and/or a Wi-Fi network. The wired communications network includes, but is not limited to, a power line network, an Ethernet network, and/or an optical network. The network control system 114 is configured to allow a person to control the on/off states of the light providers 102, as well as the intensity and/or color of light emitted from the same.

Tag readers are provided with the light providers 102. Tag readers are well known in the art, and therefore will not be described in detail herein. Any known or to be known tag reader can be used herein without limitation provided that it has a form factor which can fit inside at least a portion of a light provider structure. The tag readers are configured to read tags 112 within the RSF 100 continuously, periodically at pre-defined times (e.g., every N minutes or hours), and/or in response to trigger events (e.g., reception of a command from the network control system 114 when a theft event is detected in the RSF 100 and/or human motion is detected in proximity to a respective light provider). In this regard, the light providers 102 transmit RF carrier signals to the tags 112. The tags 112 respond to the RF carrier signals (or interrogator signals) with data response signals (or authentication reply signals) encoded with information stored on the tags 112. Each tag 112 may store information such as a unique identifier, and/or an EPC associated with an article or item to which it is coupled. Information read from the tags 112 is communicated from the light providers 102 to the network control system 114 via the wireless communications network (e.g., Wi-Fi) and/or a wired communications network (e.g., the power line network). In this way, the inventory of the RSF 100 is determined and tracked. Additionally, unauthorized movement and/or handling of the tags 112 can be detected by the network control system 114 using the tag read information.

Operations of the light providers 102 are controllable based on tag read data. For example, the network control system 114 provides all of the light providers 102 with a tag's unique identifier when an alarm event or other event (e.g., a tag find request event) is detected or otherwise determined to have recently occurred. The network control system 114 may also notify each light provider 102 when a person is detected within proximity thereof by a sensor system (e.g., a camera system). In response to the notification, a light provider 102 performs tag read operations. If the light provider 102 reads a tag having the unique identifier associated with the alarm event or other event, then it will emit a flashing light at a given intensity and/or color. The light provider 102 may additionally or alternatively output an auditory alarm and/or cause the tag to output an auditory alarm. The flashing light and/or auditory alarm is discontinued by the light provider 102 after a pre-defined period of time (e.g., 1 minute) or when the tag is no longer detected by the light provider 102. In this way, the flashing light and/or auditory alarm is output from every light provider 102 where the tag is detected such that the tag's current location and/or path of travel in the RSF 100 is clearly visible to onlookers. The present solution is not limited in this regard.

Figure 2:
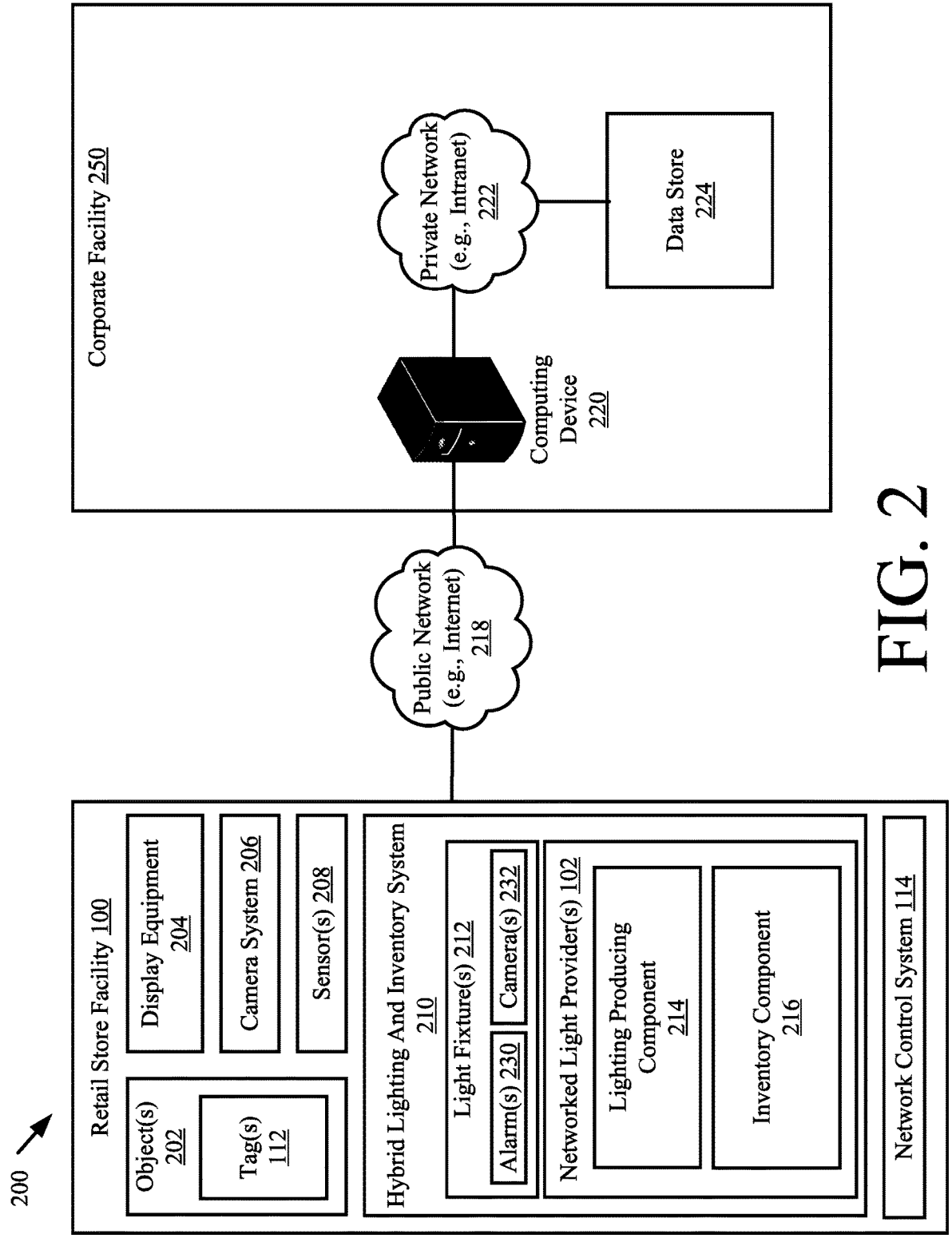
FIG. 2 is an illustration of an illustrative architecture for a system.

Referring now to FIG. 2, an illustration of an illustrative enterprise system 200 is provided. The enterprise system 200 comprises the RSF 100 and a corporate facility 250. At the RSF 100, objects 202 are offered for sale. The objects 202 can include any type of merchandise or inventory (e.g., clothing, produce, toys, electronics, etc.). The objects 202 are displayed on display equipment 204 (e.g., shelves, cabinets, tables, a rack, etc.) such that they are accessible to customers.

A camera system 206 is provided to capture images and/or videos of the rooms 102-110 inside the RSF 100. The images and/or videos are stored in a data store 224 along with time stamps. The images and/or videos are analyzed by the network control system 114 and/or a computing device 220 to (a) detect people in the RSF 100, (b) track movement of the people in the RSF 100, (c) detect objects in the RSF 100, (d) track movements of the objects in the RSF 100, and/or (e) determine if a possible theft or other event is occurring.

Sensors 208 may also be provided to detect the presence of people in given areas of the RSF 100. The sensors include, but are not limited to, beam break sensors and motion detection sensors. Data generated by the sensors 208 is communicated to the network control system 114 and/or computing device 220 for processing. The data is also stored in the data store 224 along with timestamps.

In some scenarios, some or all of the sensors 208 are provided along with the HLI system 210. For example, a sensor 208 is strategically placed adjacent to, near or otherwise in proximity to each light fixture 202. As noted above, the light fixtures 202 include, but are not limited to, light sockets, emergency lighting fixtures, elevator lighting fixtures, display equipment lighting fixtures, rack light fixtures, floor light fixtures, POS lighting fixtures, and/or self-checkout kiosk lighting fixtures. One or more of the light fixtures 202 may be provided with alarms 230. The alarms 230 can be visual alarms and/or auditory alarms. The alarms 230 can be issued or activated when (a) an alarm event or other event is detected or otherwise determined to be occurring or has recently occurred in the RSF 100, (b) a person is detected by the respective sensor 208, and (c) a tag associated with the alarm event or other event is detected in proximity to the light fixture 202.

In those or other scenarios, the camera system is integrated with the light fixtures 212. Accordingly, the light fixtures 212 can be provided with optional cameras 232. The cameras 232 can be controlled to capture image(s) and/or video(s) when an alarm event is detected in the RSF 100 or other event is determined to be occurring or has recently occurred in the RSF 100 so as to facilitate tracking of people and/or object movement through the RSF 100. The cameras 232 can be configured such that they have Field Of Views ("FOVs") that match, are the same as or are similar to the coverage area of the tag readers provided with the networked light providers 102, respectively.

A networked light provider 102 is coupled to one or more of the light fixtures 202. Each light provider 102 comprises a light producing component 214 and an inventory component 216. An illustration of an illustrative architecture for the networked light provider 102 is provided in FIG. 3. The networked light provider 102 is AC powered. The present solution is not limited in this regard. The networked light provider 102 could additionally or alternatively be battery powered and/or solar powered.

Figure 3:
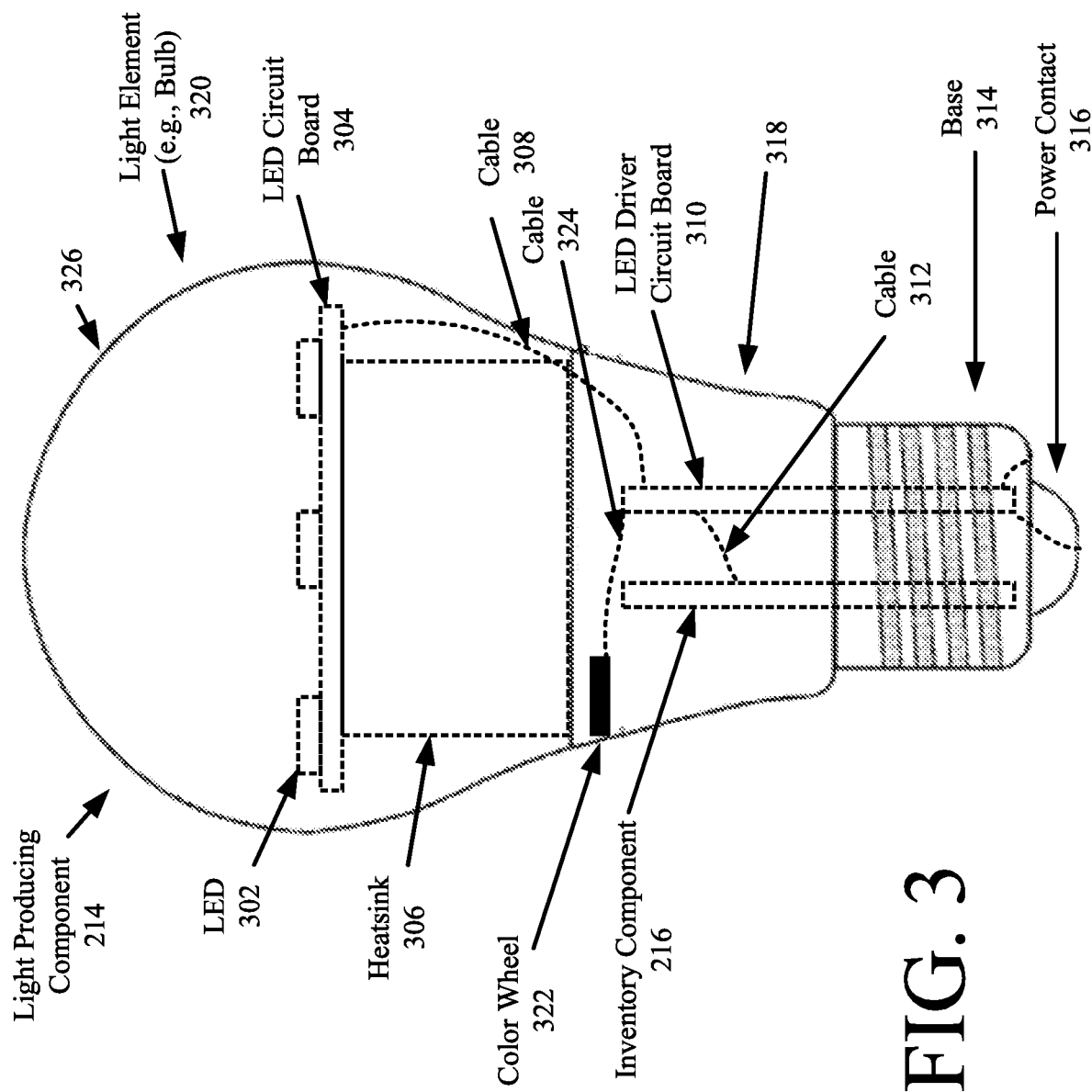
FIG. 3 is an illustration of an illustrative architecture for a networked light provider.

As shown in FIG. 3, the networked light provider 102 comprises a base 314 with a power contact 316 and a light element 320. Each portion 314, 316, 320 can be made of a single piece of material or be assembled from multiple component pieces. The base 314 and power contact 316 are collectively designed to allow the networked light provider 102 to be screwed into a standard light socket.

The light element 320 is shown in FIG. 3 as comprising a light bulb. The present solution is not limited in this regard. The light element can alternatively comprise a light tube (e.g., a florescent tube). The light bulb and light tube can have any shape designed in accordance with a given application. For example, in some scenarios, the light bulb has a conventional bulb shape as shown in FIG. 3. In other scenarios, the light bulb has a different shape than that shown in FIG. 3 (e.g., a square shape).

The bulb 320 is at least partially transparent, and comprises an LED circuit board 304 with a plurality of Light Emitting Diodes ("LEDs") 302 coupled thereto. Traces are formed on the LED circuit board 304 for electronically connecting the LEDs 302 together in a serial or parallel fashion. In some scenarios, the LEDs 302 and LED circuit board 304 are replaced with a single multi-die LED package or a single high output LED. The LED circuit board 304 and/or the LEDs 302 may be replaceable. In this case, the bulb 320 comprises two parts 318, 326 which can be separated from each other so that part 326 can be replaced or the components 302, 304 inside part 326 can be replaced.

A heat sink 306 is provided to draw heat away from the LED circuit board 304 and/or electronic components housed inside part 318 of the light element 320. The heat sink 306 may not be needed in some applications, or could have a different configuration than that shown in FIG. 3. For example, the heat sink can be at least partially incorporated into the external shape of part 326. In this case, part 326 is transparent at a top end thereof in which the LEDs reside and opaque at a bottom end thereof adjacent to the base 314. The present solution is not limited to the particulars of this example.

Part 318 has a slot through which a color wheel 322 is accessible. A person can change or otherwise set the color of the bulb 320 by rotating the color wheel 322 in a clockwise direction and/or counter clockwise direction. The color wheel 322 is electrically connected to an LED driver circuit board 310 via a cable 324. The LED driver circuit board 310 is also electrically connected to the LED circuit board 304 via a cable 308. The LED driver circuit board 310 comprises control electronics configured to control when the LEDs 302 are turned on and off, what brightness level each of the LEDs is to operate at, and/or what color the bulb 320 is to emit at any given time in accordance with a command signal received from an external device and/or the color selected via the color wheel 322.

Figure 4:
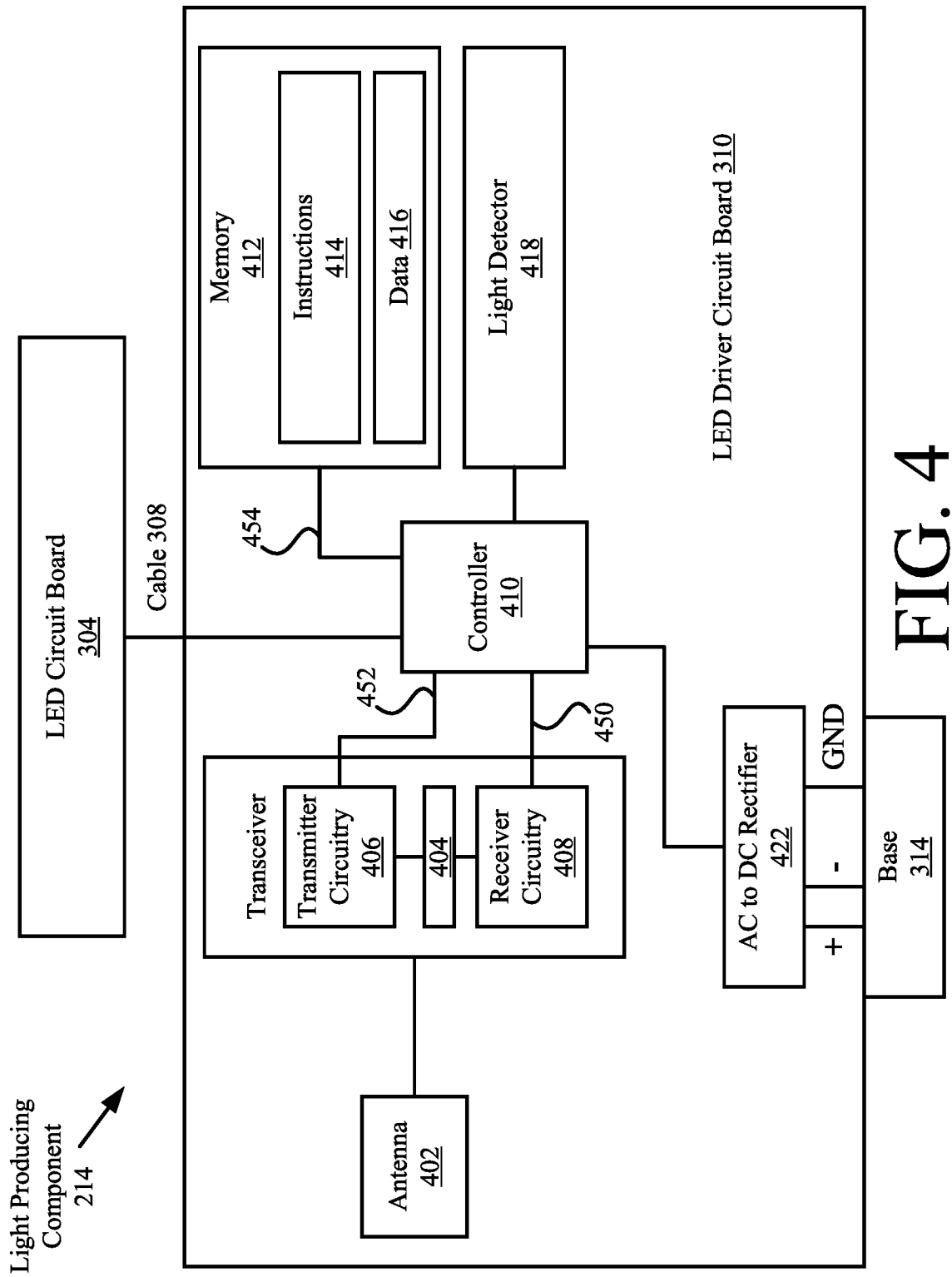
FIG. 4 is an illustration of an illustrative architecture for a light producing component of the networked light provider shown in FIG. 3.

An illustration of illustrative control electronics for the LED driver circuit board 310 is provided in FIG. 4. The LED driver circuit board 310 may include more or less components than those shown in FIG. 4. However, the components shown are sufficient to disclose an illustrative embodiment implementing the present solution. Some or all of the components of the LED driver circuit board 310 can be implemented in hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the control electronics comprise an AC to DC rectifier 422. The rectifier 422 receives AC power from the base 314. The DC power produced by the rectifier 422 is used to power the control electronics 402-420. The control electronics are generally configured to wirelessly communicate with external devices (e.g., the network control system 114 of FIG. 1 and/or other networked devices). In this regard, the control electronics comprise an antenna 402 for receiving and transmitting RF signals. In some scenarios, the antenna 402 is printed on part 318 of the light producing component 214. In other scenarios, the antenna 402 is printed on the LED driver circuit board 310, or simply comprises one or more wires disposed in part 318 and coupled to the LED driver circuit board 310. The antenna 402 can include, but is not limited to, a 2D antenna or a 3D antenna.

A switch 404 selectively couples the antenna 402 to transmitter circuitry 406 and receiver circuitry 408 in a manner familiar to those skilled in the art. The receiver circuitry 408 demodulates and decodes the RF signals received from an external device. The receiver circuitry 408 is coupled to a controller (or microprocessor) 410 via an electrical connection 450. The receiver circuitry 408 provides the decoded signal information to the controller 410. The controller 410 uses the decoded RF signal information in accordance with the function(s) of the light producing component 214. The controller 410 also provides information to the transmitter circuitry 406 for encoding and modulating information into RF signals. Accordingly, the controller 410 is coupled to the transmitter circuitry 406 via an electrical connection 452. The transmitter circuitry 406 communicates the RF signals to the antenna 402 for transmission to an external device via the switch 404.

The controller 410 is electrically connected to the LED circuit board 304 via a cable 308. The controller 410 controls the brightness level of and/or the color of light emitted from the LEDs 302 by providing a control signal to the LED circuit board 304. For example, the controller 410 may drive a control signal low to turn the LEDs 302 off, and drive a control signal high to turn the LEDs 302 on (or vice versa). In this wat, the controller 410 can cause the LEDs 302 to output flashing lights. The controller 410 can control the amount of power supplied to the LEDs 302 for adjusting the brightness level of the networked light provider 102. The brightness level of the networked light provider 102 can be adjusted so that the same indicates the location of a tag in the RSF 100. For example, the brightness level of a networked light provider 102 is adjusted to be greater than or less than the brightness level of all other networked light providers when a given tag is read thereby. The present solution is not limited in this regard.

In some scenarios, the LED driver circuit board 310 is communicatively connected to the light fixture via the base 314. The LED driver circuit board 310 can optionally control operations of the LEDs 302 when a near-by camera of a camera system 206 of FIG. 2 and/or a camera 232 of the respective light fixture 212 is to capture an image or video (e.g., based on information received from the network control system 114 of FIGS. 1-2). The LED driver circuit board 310 can decrease the brightness level of the networked light provider 102 when an image/video is to be captured and/or increase the brightness level of the networked light provider 102 when the image/video has been captured. The LED driver circuit board 310 may also communicate with adjacent networked light providers to notify the same of the camera's enablement. In response to the notification, the adjacent networked light providers can increase their brightness levels for a given period of time. These brightness level adjustments result in an optimization of the quality of images/videos that are to be captured by the camera of the networked light provider 102.

The controller 410 may store received and extracted information in memory 412 of the LED driver circuit board 310. Accordingly, the memory 412 is connected to and accessible by the controller 410 through electrical connection 454. The memory 412 may be a volatile memory and/or a non-volatile memory. For example, memory 412 can include, but is not limited to, a Random Access Memory ("RAM"), a Dynamic RAM ("DRAM"), a Read Only Memory ("ROM") and a flash memory. The memory 412 may also comprise unsecure memory and/or secure memory. The memory 412 can be used to store various types of data 416 therein.

One or more sets of instructions 414 are stored in memory 412. The instructions may include customizable instructions and non-customizable instructions. The instructions 414 can also reside, completely or at least partially, within the controller 410 during execution thereof by light producing component 214. In this regard, the memory 412 and the controller 410 can constitute machine-readable media. The term "machine-readable media", as used herein, refers to a single medium or multiple media that stores one or more sets of instructions 414. The term "machine-readable media", as used here, also refers to any medium that is capable of storing, encoding or carrying the set of instructions 414 for execution by the light producing component 214 and that causes the light producing component 214 to perform one or more of the methodologies of the present disclosure.

The controller 410 is also connected to a light detector 418. The light detector 418 allows the networked light provider 102 to reflect modulated light around a room and off the floor, which can be read by other networked light providers.

Referring again to FIG. 3, an inventory component 216 is also disposed in part 318 of the bulb 320. The inventory component 216 is generally configured to detect tags in proximity to the networked light provider 102, and communicate such detections to the LED driver circuit board 310. In this regard, the inventory component 216 implements tag read technology (e.g., RFID technology). The times of tag reads performed by the inventory component 216 are selected such that heat generated by the inventory component 216 has a minimal effect on the life of the LEDs 302 or other light producing/emitting/radiating element. For example, in some scenarios, tag reads only occur during business hours when certain criteria is met. The criteria can include, but is not limited to, pre-defined times selected in accordance with given read rates, the detection of a person in proximity to the light producing component 214, and/or the recent occurrence of an event in the RSF 100. Additionally or alternatively, tag reads for inventory purposes can be performed during off-business hours when the light producing component 214 is not producing light. Techniques for detecting events in RSFs are well known in the art, and therefore will not be described in detail herein. Any known or to be known technique for detecting events can be used herein without limitation.

Figure 5:
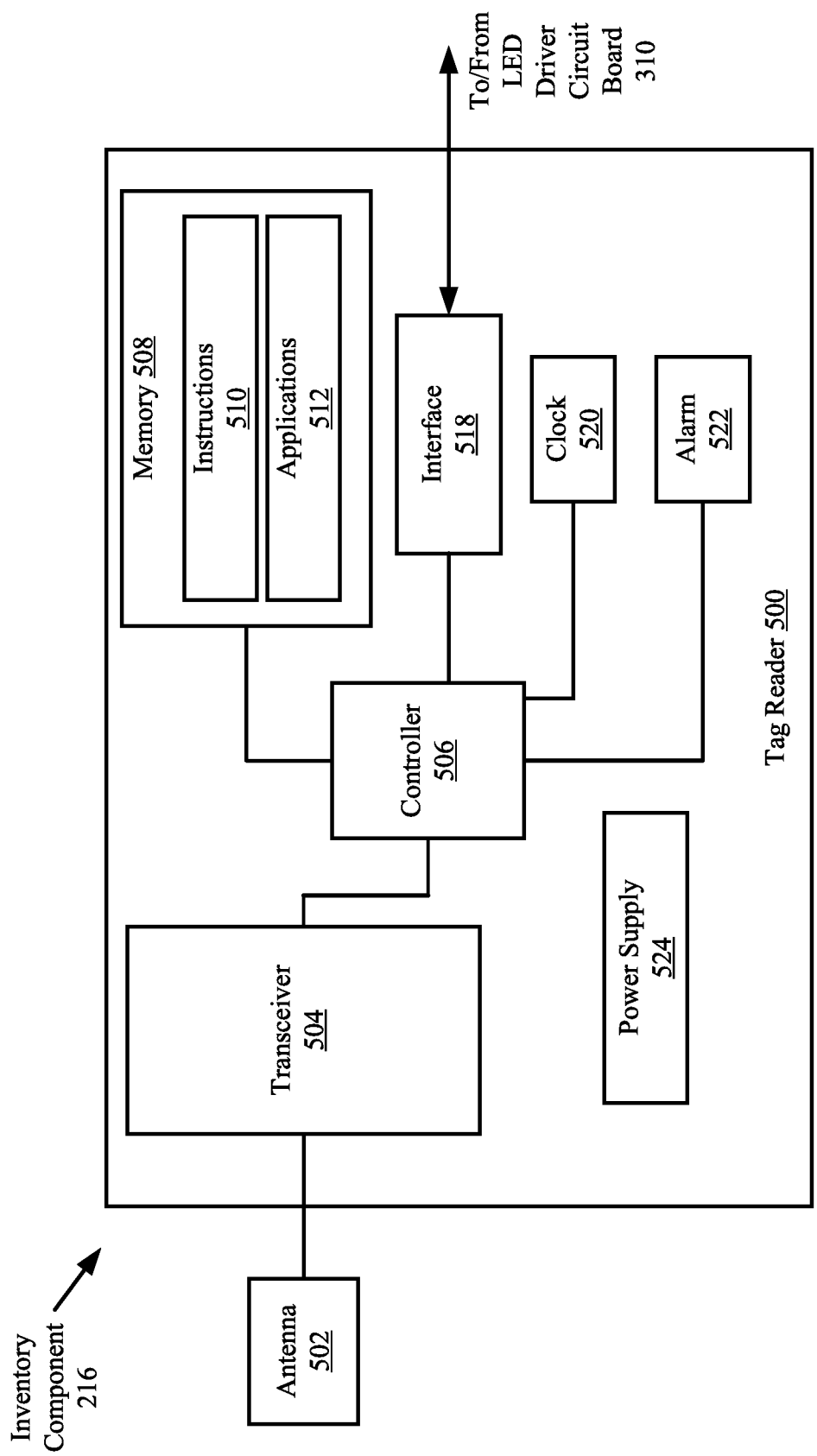
FIG. 5 is an illustration of an illustrative architecture for an inventory component of the networked light provider shown in FIG. 3.

An illustration of an illustrative architecture for the inventory component 216 is provided in FIG. 5. As shown in FIG. 5, the inventory component 216 comprises a tag reader 500. The tag reader 500 may include more or less components than that shown in FIG. 5. However, the components shown are sufficient to disclose an illustrative embodiment implementing the present solution. Some or all of the components of the tag reader 500 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 5 represents an illustration of a representative tag reader 500 configured to facilitate improved inventory counts and management within an RSF (e.g., RSF 100 of FIG. 1). In this regard, the tag reader 500 is generally configured to allow data to be exchanged with an external device (e.g., tags 112 of FIGS. 1-2) via RF technology. The tag reader 500 may include a power source 524 (e.g., a battery) or be connected to the base 314 of the light producing component from which AC power is received.

The tag reader 500 comprises an antenna 402 for allowing data to be exchanged with the external device via wireless technology (e.g., RFID technology or other RF based technology). The external device may comprise tags 112 of FIGS. 1-2. In this case, the antenna 302 is configured to transmit wireless carrier signals (e.g., interrogation signals) to the listed external devices, and/or transmit data response signals (e.g., authentication reply signals) generated by the tag reader 500. The antenna 302 is coupled to a tag reader 500. The tag reader 500 comprises a transceiver 504. Transceivers are well known in the art, and therefore will not be described herein. However, it should be understood that the transceiver 504 receives wireless signals (e.g., RF signals) including information from the transmitting device, and forwards the same to a controller 506 for extracting the information therefrom.

The extracted information can be used to determine the presence, location and/or path of travel of an tag within a facility (e.g., RSF 100 of FIG. 1). Accordingly, the controller 506 can store the extracted information in memory 508, and execute software applications 512 using the extracted information. For example, the controller 506 can notify the LED driver circuit board 310 when a tag is detected by the tag reader 500 that has a particular identifier associated therewith (e.g., one that is associated with a theft event or other alarm event). Other operations performed by the controller 506 will be apparent from the following discussion.

Notably, memory 508 may be a volatile memory and/or a non-volatile memory. For example, the memory 508 can include, but is not limited to, a RAM, a DRAM, an SRAM, a ROM, and a flash memory. The memory 508 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 510 are stored in memory for execution by the tag reader 500 and that cause the tag reader 500 to perform any one or more of the methodologies of the present disclosure. The instructions 510 are generally operative to facilitate determinations as to whether or not tags are present within a facility, where the tags are located within a facility, and/or whether certain tags are in motion at any given time. Other functions of the tag reader 500 will become apparent as the discussion progresses.

Figure 6:
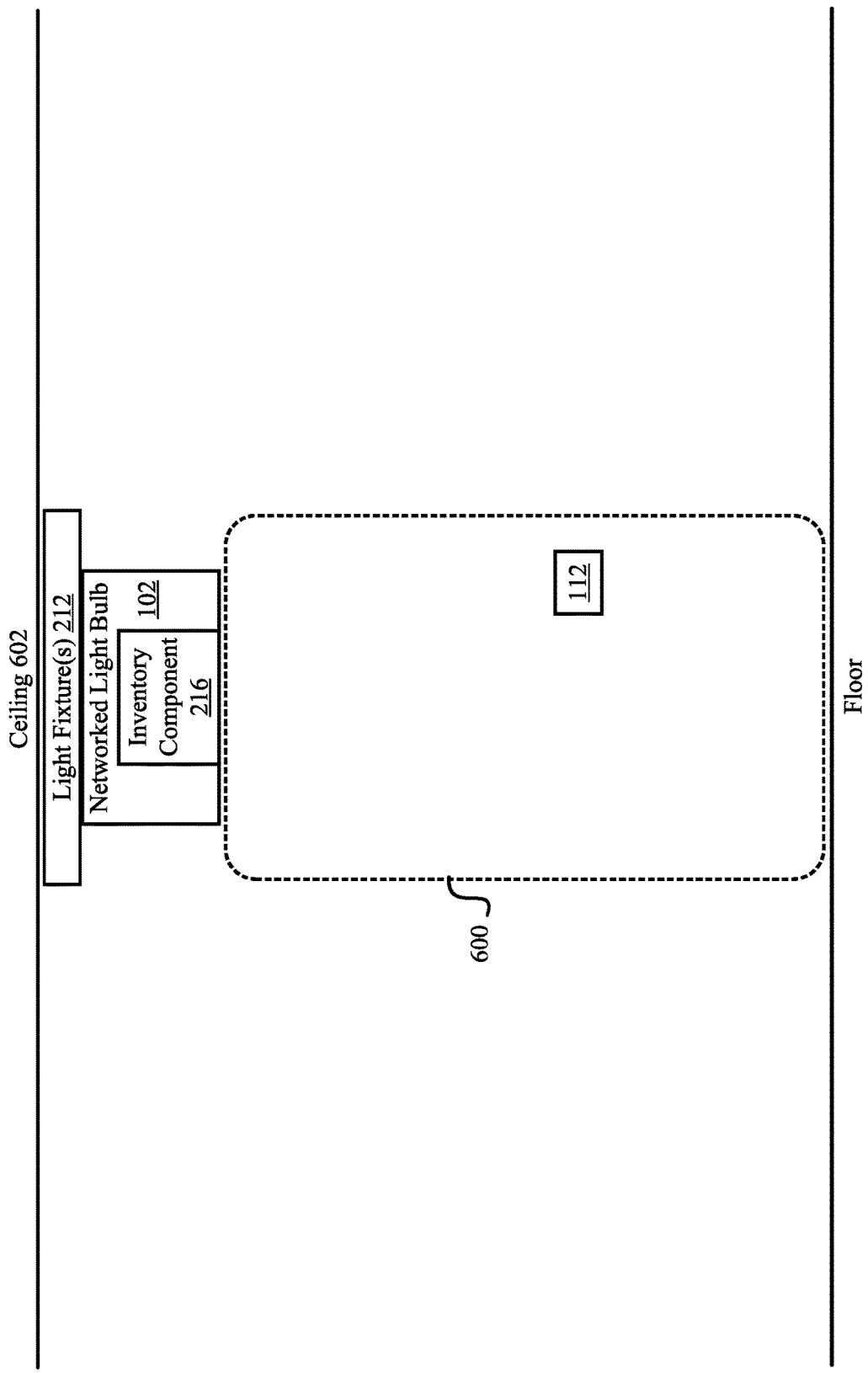
FIG. 6 is an illustration that is useful for understanding operations of the inventory component shown in FIG. 5.

Referring now to FIG. 6, there is provided an illustration that is useful for understanding operations of the inventory component 216. During operations, the inventory component 216 detects the presence of an active tag 112 when the same is read by the tag reader 500 in its coverage area. The antenna 502 is suitable for aiding in the detection of the tags, as described herein. In this regard, the antenna 502 is suitable for transmitting or producing interrogation signals and receiving response signals generated by tags in the tag reader's coverage area. The tag reader's coverage area defines the detection zone 600. In some scenarios, the detection zone 600 is provided under a respective networked light provider 102 coupled to a light fixture disposed in the ceiling 602 of the RSF 100. In response to the detection of the tag, the tag reader 500 sounds an alarm, performs operations to cause a light fixture 212 and/or networked light provider 102 to sound an alarm, and/or performs operations to cause the networked light provider 102 to emit light with certain characteristics (e.g., brightness, color, continuous and/or flashing). Accordingly, the networked light provider 102 is arranged for detecting articles for inventory purposes and/or facilitating the prevention of an unauthorized removal of articles or products from controlled areas.

Figure 7:
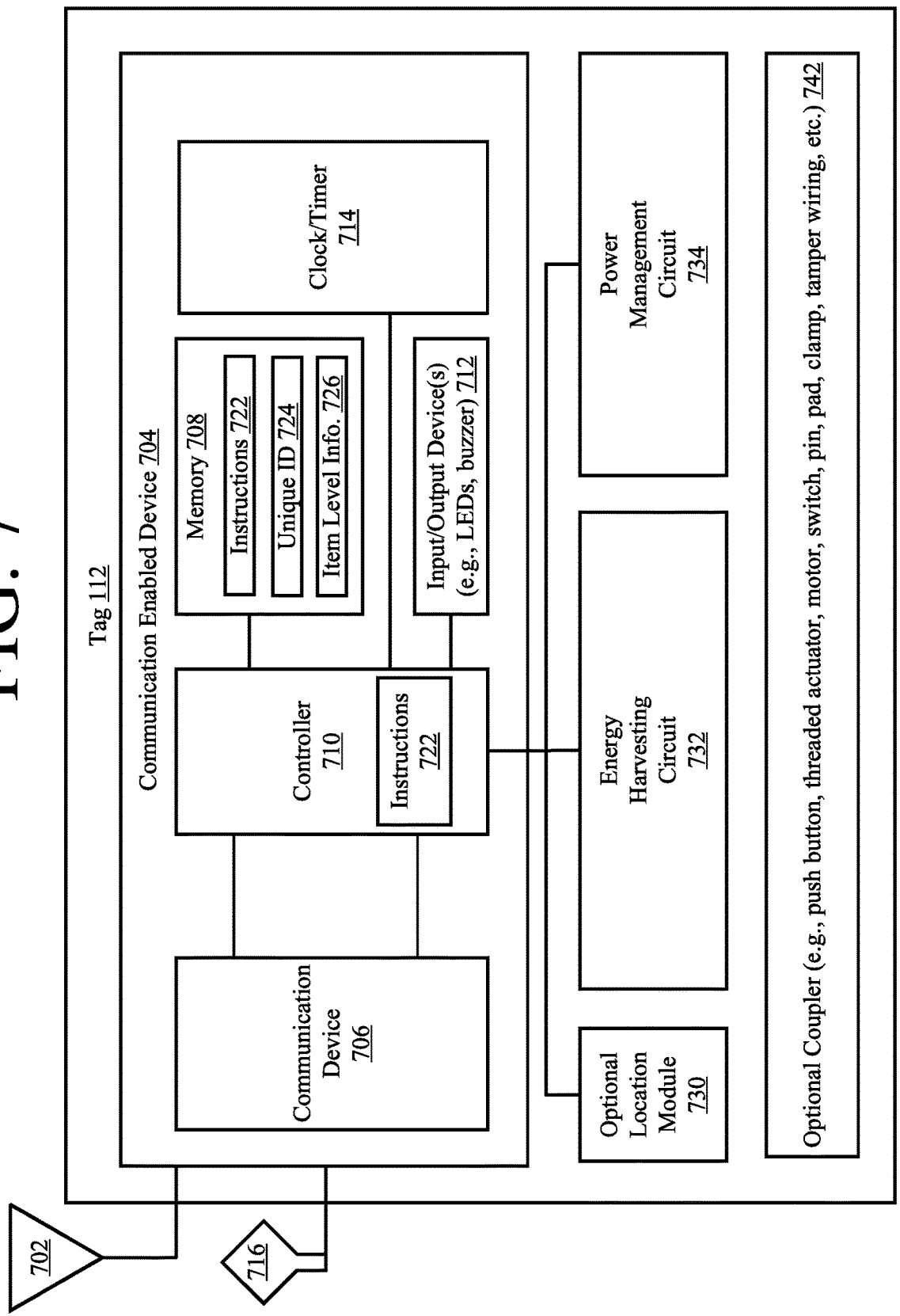
FIG. 7 is an illustration of an illustrative architecture for a tag.

Referring now to FIG. 7, there is provided an illustration of an illustrative architecture for a tag 112. Tag 112 can include more or less components than that shown in FIG. 7. However, the components shown are sufficient to disclose an illustrative embodiment implementing the present solution. Some or all of the components of the tag 112 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 7 represents a representative tag 112 configured to facilitate improved inventory management. In this regard, the tag 112 is configured for allowing data to be exchanged with an external device (e.g., inventory component 216 of FIGS. 2 and 5) via wireless communication technology. The wireless communication technology can include, but is not limited to, RFID technology, a Near Field Communication ("NFC") technology, and/or a Short Range Communication ("SRC") technology. For example, one or more of the following wireless communication technologies (is)are employed Radio Frequency ("RF") communication technology, Bluetooth technology, and/or WiFi technology. Each of the listed wireless communication technologies is well known in the art, and therefore will not be described in detail herein. Any known or to be known wireless communication technology or other wireless communication technology can be used herein without limitation.

The components 706-714 shown in FIG. 7 may be collectively referred to herein as a communication enabled device 704, and include a memory 708 and a clock/timer 714. Memory 708 may be a volatile memory and/or a non-volatile memory. For example, the memory 708 can include, but is not limited to, Random Access Memory ("RAM"), Dynamic RAM ("DRAM"), Static RAM ("SRAM"), Read Only Memory ("ROM") and flash memory. The memory 708 may also comprise unsecure memory and/or secure memory.

In some scenarios, the communication enabled device 704 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 708. Notably, the communication protocols can be downloaded to the device at any given time. The initial/default role (being an RFID, WiFi, LiFi, etc. tag) can be assigned at the deployment thereof. If the user desires to use another protocol at a later time, the user can remotely change the communication protocol of the deployed tag 112. The update of the firmware, in case of issues, can also be performed remotely.

As shown in FIG. 7, the communication enabled device 704 comprises at least one antenna 702, 716 for allowing data to be exchanged with the external device via a wireless communication technology (e.g., an RFID technology, an NFC technology and/or a SRC technology). The antenna 702, 716 is configured to receive signals from the external device and/or transmit signals generated by the communication enabled device 704. The antenna 702, 716 can comprise a near-field or far-field antenna. The antennas include, but are not limited to, a chip antenna or a loop antenna.

The communication enabled device 704 also comprises a communication device (e.g., a transceiver or transmitter) 706. Communication devices (e.g., transceivers or transmitters) are well known in the art, and therefore will not be described herein. However, it should be understood that the communication device 706 generates and transmits signals (e.g., RF carrier signals) to external devices, as well as receives signals (e.g., RF signals) transmitted from external devices. In this way, the communication enabled device 704 facilitates the registration, identification, location and/or tracking of an item (e.g., object 202 of FIG. 2) to which the tag 112 is coupled.

The communication enabled device 704 facilitates the automatic and dynamic modification of item level information 726 that is being or is to be output from the tag 112 in response to certain trigger events. The trigger events can include, but are not limited to, the tag's arrival at a particular facility (e.g., RSF 100 of FIG. 1), the tag's arrival in a particular country or geographic region, a date occurrence, a time occurrence, a price change, and/or the reception of user instructions.

Item level information 726 and a unique identifier ("ID") 724 for the tag 112 (e.g., an EPC) can be stored in memory 708 of the communication enabled device 704 and/or communicated to other external devices (e.g., tag reader 500 of FIG. 5) via communication device (e.g., transceiver) 706. For example, the communication enabled device 704 can communicate information specifying a timestamp, a unique identifier for an item, item description, item price, a currency symbol and/or location information to an external device. The external device can then store the information in a database (e.g., memory 508 of FIG. 5 and/or data store 224 of FIG. 2) and/or use the information for various purposes.

The communication enabled device 704 also comprises a controller 710 (e.g., a CPU) and input/output devices 712. The controller 710 can execute instructions 722 implementing methods for facilitating inventory counts and management. In this regard, the controller 710 includes a processor (or logic circuitry that responds to instructions) and the memory 708 includes a computer-readable storage medium on which is stored one or more sets of instructions 722 (e.g., software code) configured to implement one or more of the methodologies, procedures, or functions described herein. The instructions 722 can also reside, completely or at least partially, within the controller 710 during execution thereof by the tag 112. The memory 708 and the controller 710 also can constitute machine-readable media. The term "machine-readable media", as used here, refers to a single medium or multiple media (e.g., a centralized or distributed database, and/or associated caches and servers) that store the one or more sets of instructions 722. The term "machine-readable media", as used here, also refers to any medium that is capable of storing, encoding or carrying a set of instructions 722 for execution by the tag 112 and that cause the tag 112 to perform any one or more of the methodologies of the present disclosure.

The input/output devices can include, but are not limited to, a display (e.g., an E Ink display, an LCD display and/or an active matrix display), a speaker, a keypad and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 112 (e.g., when an alert condition exists) and/or for notifying the person of a particular pricing status (e.g., on sale status) of the item to which the tag is coupled.

The clock/timer 714 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 112 also comprises an optional location module 730. The location module 730 is generally configured to determine the geographic location of the tag at any given time. For example, in some scenarios, the location module 730 employs Global Positioning System ("GPS") technology and/or Internet based local time acquisition technology. The present solution is not limited to the particulars of this example. Any known or to be known technique for determining a geographic location can be used herein without limitation including relative positioning within a facility or structure.

The optional coupler 742 is provided to securely or removably couple the tag 112 to an item (e.g., object 202 of FIG. 2). The coupler 742 includes, but is not limited to, a mechanical coupling means (e.g., a strap, clip, clamp, snap) and/or adhesive (e.g., glue or sticker). The coupler 742 is optional since the coupling can be achieved via a weld and/or chemical bond.

The tag 112 can also include an energy harvesting circuit 732 for ensuring continuous operation of the tag 200 without the need to change a rechargeable power source (e.g., a battery). In some scenarios, the energy harvesting circuit 732 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

A power management circuit 734 is provided for controlling the supply of power to components of the tag 112. In the event all of the storage and harvesting resources deplete to a point where the tag 112 is about to enter a shutdown/brownout state, the power management circuit 734 can cause an alert to be sent from the tag 112 to a remote device. The remote device can include a tag reader 500 of a networked light provider 102 of FIG. 1. In response to the alert, the tag reader 500 can transmit RF signals for charging an energy storage device (e.g., a capacitor) of the energy harvesting circuit 732. Additionally or alternatively, the networked light provider 102 can turn on and/or increase an intensity of light emitted therefrom for charging the energy storage device (e.g., a capacitor) of the energy harvesting circuit 732. In some scenarios, the energy storage devices of tags 112 are only charged during off hours or when no humans are detected within proximity of the networked light provider 102.

Figure 8:
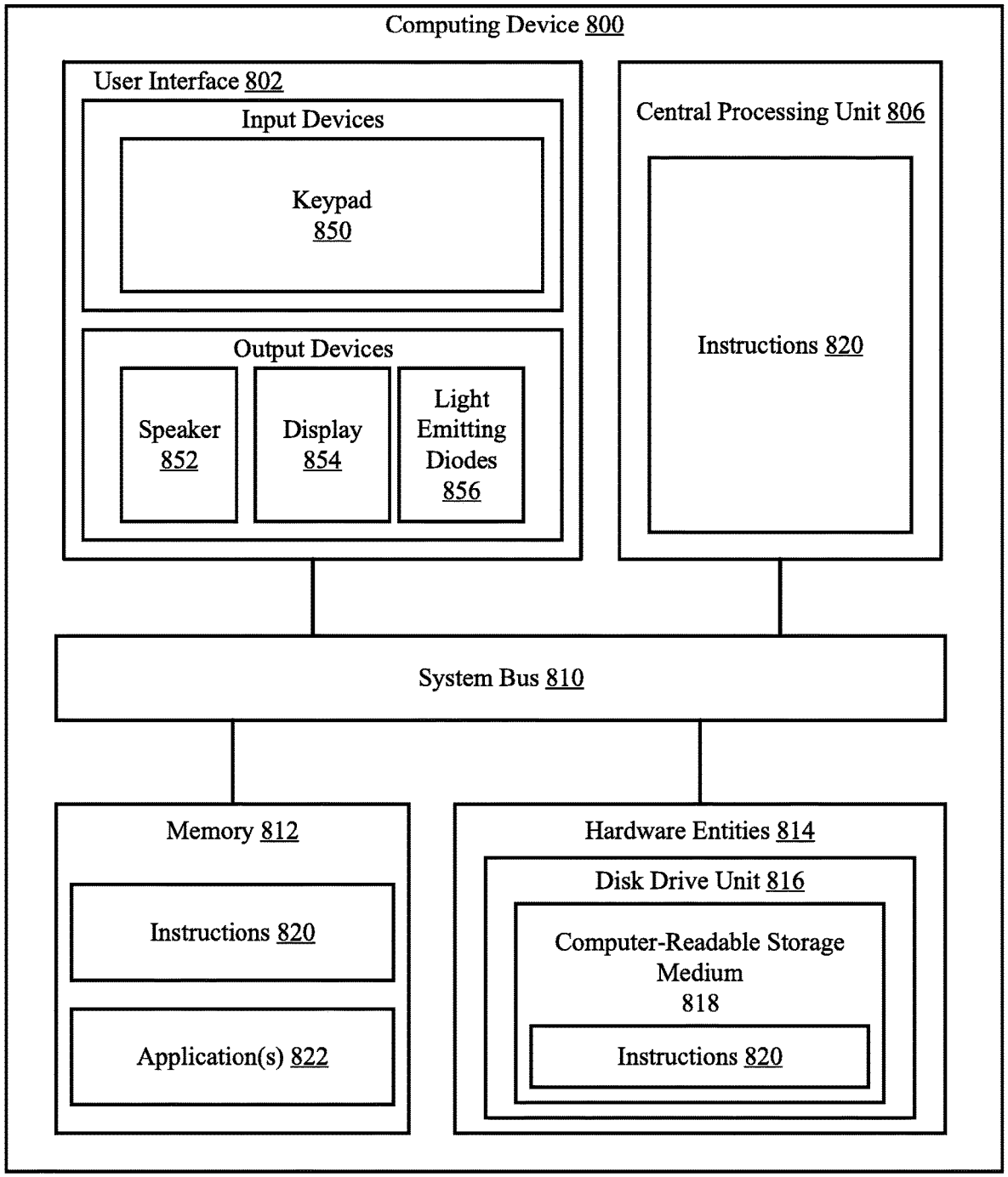
FIG. 8 is an illustration of an illustrative architecture for a computing device.

Referring now to FIG. 8, there is provided a detailed block diagram of an illustrative architecture for a computing device 800. The network control system 112 of FIGS. 1-2 and/or the computing device 220 of FIG. 2 is/are the same as or substantially similar to computing device 800. As such, the following discussion of computing device 800 is sufficient for understanding computing device 800.

Notably, the computing device 800 may include more or less components than those shown in FIG. 8. However, the components shown are sufficient to disclose an illustrative embodiment implementing the present solution. The hardware architecture of FIG. 8 represents one embodiment of a representative computing device configured to facilitate an improved inventory process. As such, the computing device 800 of FIG. 8 implements at least a portion of the methods described herein.

Some or all the components of the computing device 800 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 8, the computing device 800 comprises a user interface 802, a Central Processing Unit ("CPU") 806, a system bus 810, a memory 812 connected to and accessible by other portions of computing device 800 through system bus 810, and hardware entities 814 connected to system bus 810. The user interface can include input devices (e.g., a keypad 850) and output devices (e.g., speaker 852, a display 854, and/or light emitting diodes 856), which facilitate user-software interactions for controlling operations of the computing device 800.

At least some of the hardware entities 814 perform actions involving access to and use of memory 812, which can be a RAM, a disk driver and/or a Compact Disc Read Only Memory ("CD-ROM"). Hardware entities 814 can include a disk drive unit 816 comprising a computer-readable storage medium 818 on which is stored one or more sets of instructions 820 (e.g., software code) configured to implement one or more of the methodologies, procedures, or functions described herein. The instructions 820 can also reside, completely or at least partially, within the memory 812 and/or within the CPU 806 during execution thereof by the computing device 800. The memory 812 and the CPU 806 also can constitute machine-readable media. The term "machine-readable media", as used here, refers to a single medium or multiple media (e.g., a centralized or distributed database, and/or associated caches and servers) that store the one or more sets of instructions 820. The term "machine-readable media", as used here, also refers to any medium that is capable of storing, encoding or carrying a set of instructions 820 for execution by the computing device 800 and that cause the computing device 800 to perform any one or more of the methodologies of the present disclosure.

In some scenarios, the hardware entities 814 include an electronic circuit (e.g., a processor) programmed for facilitating the determination of an inventory within a facility, the determination of tag locations within the facility, the provision of a three dimensional map showing locations of tags within the facility, the detection of alert events, and/or the control of a hybrid LI system. In this regard, it should be understood that the electronic circuit can access and run application(s) 822 installed on the computing device 800. The software application(s) 822 is(are) generally operative to facilitate the determination of an inventory within a facility, the determination of tag locations within the facility, the mapping of the tag locations in a virtual three dimensional space, the detection of alert events, and/or the control of a hybrid LI system. The software application(s) 822 is(are) also operative to use product identification codes (e.g., tag SKU information) to group tags into product (e.g., SKU) areas; determine generic human readable names for the product (e.g., SKU) areas; and add visual lines and/or text to the map for visually showing product (e.g., SKU) areas. Other functions of the software application(s) 822 will become apparent as the discussion progresses.

Illustrative Method For Determining Inventory

Figure 9:
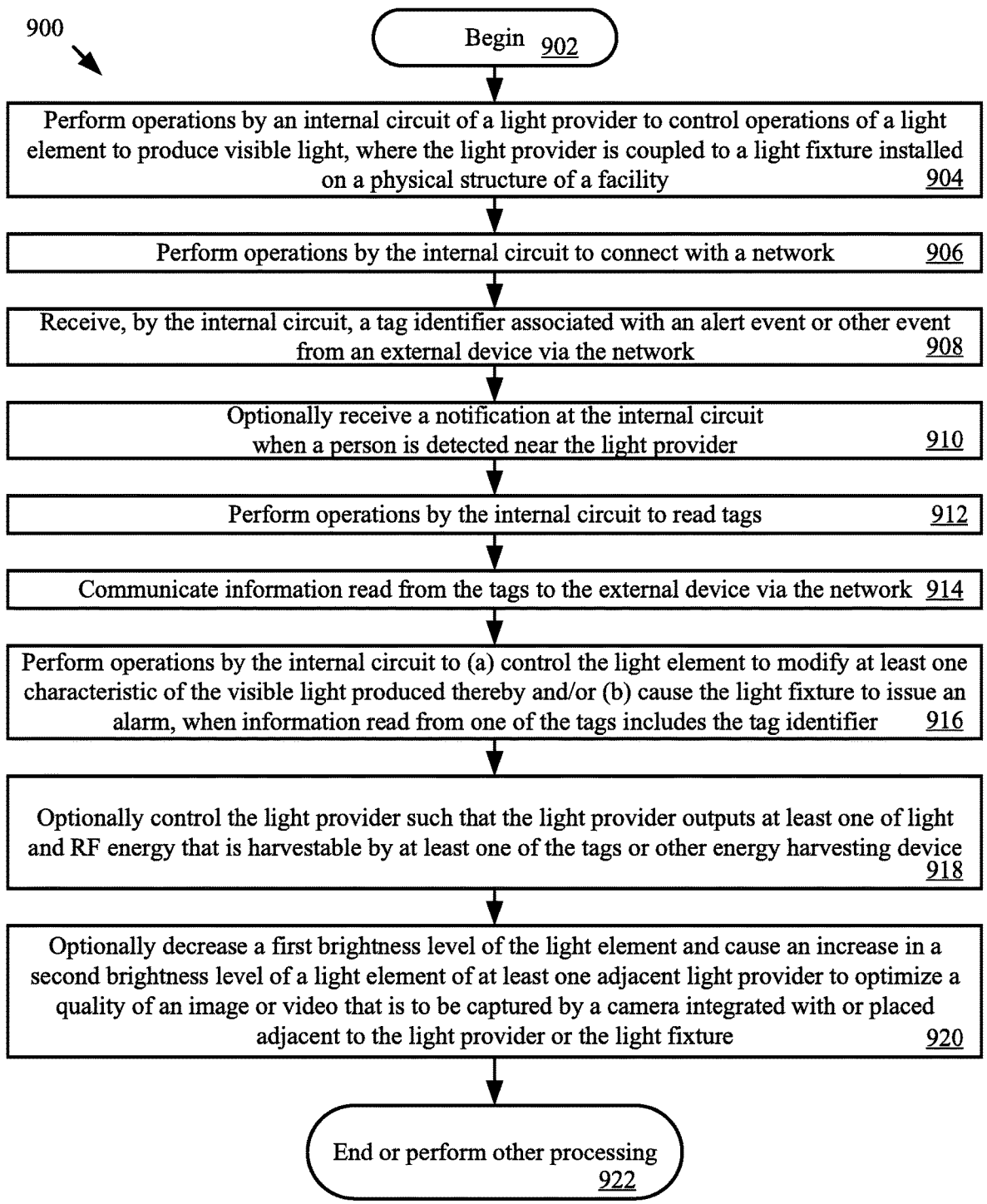
FIG. 9 is a flow diagram of an illustrative method for determining an inventory.

Referring now to FIG. 9, there is provided a flow diagram of an illustrative method 900 for determining an inventory using a hybrid LI system. As shown in FIG. 9, method 900 comprises a plurality of operations 904-920. The present solution is not limited to the order in which the operations are presented in FIG. 9. The operations can be performed in an order different than that shown in FIG. 9.

Method 900 begins with 902 and continues with 904 where an internal circuit (e.g., LED driver circuit 310 and/or inventory component 216 of FIGS. 3-5) of a light provider (e.g., light provider 102 of FIGS. 1-2) controls operations of a light element (e.g., light element 320 of FIG. 3) to produce visible light. The light provider is coupled to a light fixture (e.g., light fixture 212 of FIG. 2) installed on a physical structure of a facility (e.g., RSF 100 of FIGS. 1-2).

In 906, the internal circuit connects to a network. Thereafter in 908, the internal circuit receives a tag identifier associated with an alert event or other event from an external device (e.g., the network control system 114 of FIGS. 1-2 and/or computing device 220 of FIG. 2). The alert event may include possible theft of an object (e.g., object 202 of FIG. 2) to which a tag (e.g., tag 112 of FIGS. 1-2 and 7) is coupled. The other event can include, but is not limited to, a tag find request event. The internal circuit may also optionally receive a notification when a person is detected near the light provider, as shown by 910. This detection of the person can be made using images/videos captured by a camera system (e.g., camera system 206 and/or 232 of FIG. 2) and/or sensor data generated by sensors (e.g., sensors 208 of FIG. 2) located near the light provider.

In 912, the internal circuit performs operations to read tags. Information read from the tags is communicated from the light provider to the external device via the network in 914. This information received from each read tag is processed by the internal circuit to determine if it includes the unique identifier associated with the alert event or other event. If so, the internal circuit (a) controls the light element to modify at least one characteristic of the visible light (e.g., on/off state, brightness level, continuous to flashing, and/or color) produced thereby and/or (b) causes the light fixture to issue or enable an alarm (e.g., alarm 230 of FIG. 2), as shown by 916. The alarm may be an auditory alarm (e.g., a siren or sequential beeps) or a visual alarm (e.g., a colored flashing light).

In 918, the light provider is optionally controlled by the internal circuit such that the light provider outputs at least one of light and RF energy that is harvestable by at least one of the tags or other energy harvesting device. In 920, the internal circuit performs operations to decrease a first brightness level of the light element and cause an increase in a second brightness level of a light element of at least one adjacent light provider to optimize a quality of an image or video that is to be captured by a camera (e.g., camera 232 of FIG. 2) integrated with the light fixture or a camera (e.g., camera system 206 of FIG. 2) placed in proximity to the light fixture. Subsequently, 922 is performed where method 900 ends or other processing is performed (e.g., the light provider is turned off and/or method 900 returns to 902).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for determining an inventory, comprising:
performing first operations by an internal circuit of a light provider to control operations of a light element to produce visible light, where the light provider is coupled to a light fixture installed on a physical structure of a facility; and
performing second operations by the internal circuit of the light provider to:
connect with a network;
receive, from a control system via the network, a tag identifier associated with an alert event detected by a first reader device external to the light provider;
read, via a second reader device internal to the light provider, a tag after receiving the tag identifier to determine tag read information;
determine that the tag read information includes the tag identifier; and
in response to the tag read information including the tag identifier, control the light element to modify at least one characteristic of the visible light produced thereby.

2. The method according to claim 1, wherein the light element comprises a light bulb or a light tube.

3. The method according to claim 2, wherein the internal circuit comprises an antenna printed on the light bulb or the light tube.

4. The method according to claim 1, wherein the internal circuit controls at least one of an on/off state, a brightness, or a color of the light element.

5. The method according to claim 1, further comprising performing the second operations by the internal circuit to communicate information read from the tag to at least one external device via the network.

6. The method according to claim 1, further comprising performing the second operations by the internal circuit to:
receive a notification from at least one external device when a person is detected near the light provider; and
control the light element to provide the visible light with the at least one characteristic when information read from the tag includes the tag identifier and the information is read within a pre-defined period of time from receipt of the notification.

7. The method according to claim 1, further comprising second performing the operations by the internal circuit to cause the light fixture to issue an alarm when information read from the tag includes the first tag identifier.

8. The method according to claim 1, wherein the tag is a first tag, and further comprising performing the second operations by the internal circuit to control the light provider such that the light provider outputs at least one of light and Radio Frequency ("RF") energy that is harvestable by a second tag or other energy harvesting device.

9. The method according to claim 1, wherein the internal circuit performs the tag read in a manner that minimizes an effect of heat generated by the internal circuit on a life of the light element.

10. The method according to claim 1, further comprising performing the second operations by the internal circuit to decrease a first brightness level of the light element and cause an increase in a second brightness level of a respective light element of at least one adjacent light provider to optimize a quality of an image or video that is to be captured by a first camera integrated with the light fixture or a second camera placed in proximity to the light fixture.

11. A light provider, comprising:
a light element configured to produce visible light;

a base coupled to the light element, configured to fit in a light fixture, and comprising a power contact for connecting to an external power source via the light fixture; and an internal circuit configured of the light provider to:
control operations of the light element;
connect with a network;
receive, from a control system via the network, a tag identifier associated with an alert event detected by a first reader device external to the light provider;
read, via a second reader device internal to the light provider, a tag after receiving the tag identifier to determine tag read information; and
in response to determining that tag read information includes the tag identifier, control the light element to modify at least one characteristic of the visible light produced thereby.

12. The light provider according to claim 11, wherein the light element comprises a light bulb or a light tube.

13. The light provider according to claim 12, wherein the internal circuit comprises an antenna printed on the light bulb or the light tube.

14. The light provider according to claim 11, wherein the internal circuit performs the operations to turn the light element on or off.

15. The light provider according to claim 11, wherein the internal circuit controls at least one of a brightness and a color of the light element.

16. The light provider according to claim 11, wherein the internal circuit is configured to communicate information read from the tag to at least one external device via the network.

17. The light provider according to claim 11, wherein the internal circuit is further configured to:

receive a notification from at least one external device when a person is detected near the light provider; and
control the light element to provide the visible light with the at least one characteristic when information read from the tag includes the first tag identifier and the information is read within a pre-defined period of time from receipt of the notification.

18. The light provider according to claim 11, wherein the internal circuit is further configured to cause the light fixture to issue an alarm when information read from the tag includes the first tag identifier.

19. The light provider according to claim 11, wherein the tag is a first tag, and wherein the internal circuit is further configured to control the light provider such that the light provider outputs at least one of light and Radio Frequency ("RF") energy that is harvestable by a second tag or other energy harvesting device.

20. The light provider according to claim 11, wherein the internal circuit is further configured to perform the read of the tag in a manner that minimizes an effect of heat generated by the internal circuit on a life of the light element.

21. The light provider according to claim 11, wherein the internal circuit is further configured to decrease a first brightness level of the light element and cause an increase in a second brightness level of a respective light element of at least one adjacent light provider to optimize a quality of an image or video that is to be captured by a first camera integrated with the light fixture or a second camera placed in proximity to the light fixture.

22. The light provider according to claim 11, wherein the internal circuit is further configured to cause the light element to flash on and off and to issue an alarm when information read from the tag includes the tag identifier.

* * * * *

UNITED STATES PATENT AND TRADEMARK OFFICE
CERTIFICATE OF CORRECTION

PATENT NO. : 11,295,268 B2
APPLICATION NO. : 16/279222
DATED : April 5, 2022
INVENTOR(S) : Steve E. Trivelpiece It is certified that error appears in the above-identified patent and that said Letters Patent is hereby corrected as shown below:

On the Title Page

1. Item (71) Applicant reads: "Steve E. Trivelpiece, Rancho Santa Margarita, CA (US); Adam S. Bergman, Boca Raton, FL (US); Craig E. Trivelpiece, Mission Viejo, CA (US); Eric F. Riggert, Trabuco Canyon, CA (US)". Item (71) Applicant should read: -- SENSORMATIC ELECTRONICS, LLC, Boca Raton, FL (US) --.

2. In Item (56), under "OTHER PUBLICATIONS", in Column 2, Line 2, delete "Applicaton" and insert -- Application --, therefor.

In the Specification

3. In Column 8, Line 11, delete "wat," and insert -- way --, therefor.

4. In Column 15, Line 34, delete "continuous to" and insert -- continuous --, therefor.

In the Claims

5. In Column 18, Line 5, in Claim 17, delete "first tag" and insert -- tag --, therefor.

Signed and Sealed this
Twelfth Day of July, 2022

Katherine Kelly Vidal
*Director of the United States Patent and Trademark Office*